United States Patent [19]

Nemes

[11] Patent Number: 5,287,499
[45] Date of Patent: * Feb. 15, 1994

[54] METHODS AND APPARATUS FOR INFORMATION STORAGE AND RETRIEVAL UTILIZING A METHOD OF HASHING AND DIFFERENT COLLISION AVOIDANCE SCHEMES DEPENDING UPON CLUSTERING IN THE HASH TABLE

[75] Inventor: Richard M. Nemes, Brooklyn, N.Y.

[73] Assignee: Bell Communications Research, Inc., Livingston, N.J.

[*] Notice: The portion of the term of this patent subsequent to Feb. 26, 2008 has been disclaimed.

[21] Appl. No.: 702,444

[22] Filed: May 16, 1991

Related U.S. Application Data

[63] Continuation of Ser. No. 326,976, Mar. 22, 1989, abandoned.

[51] Int. Cl.⁵ ............................................. G06F 12/00
[52] U.S. Cl. ................................... 395/600; 395/700; 371/5.1; 364/962; 364/962.1; 364/963; 364/DIG. 2
[58] Field of Search ............... 395/700, 600, 800; 364/900; 371/5.1

[56] References Cited

U.S. PATENT DOCUMENTS

| | | | |
|---|---|---|---|
| 3,704,363 | 11/1972 | Salmassy et al. | 371/5.1 |
| 4,339,657 | 7/1982 | Larson et al. | 371/5.1 |
| 4,380,067 | 4/1983 | Beardsley et al. | 371/11.2 |
| 4,564,944 | 1/1986 | Arnold et al. | 371/37 |
| 4,638,426 | 1/1987 | Chang et al. | 364/200 |
| 4,663,620 | 5/1987 | Paul et al. | 340/825.5 |
| 4,680,700 | 7/1987 | Hester et al. | 364/200 |
| 4,680,703 | 7/1987 | Kriz | 364/200 |
| 4,695,949 | 9/1987 | Thatte et al. | 364/200 |
| 4,764,863 | 8/1988 | Silverthorn, III et al. | 364/200 |
| 4,866,712 | 9/1989 | Chao | 371/5.1 |
| 4,922,417 | 5/1990 | Churm et al. | 364/200 |
| 4,961,139 | 10/1990 | Hong et al. | 364/200 |
| 4,979,105 | 12/1990 | Daly et al. | 395/575 |
| 4,996,663 | 2/1991 | Nemes | 364/900 |

OTHER PUBLICATIONS

D. Knuth, *The Art of Computer Programming,* vol. 3, Sorting and Searching, Addison-Wesley, Reading, Mass., 1973, pp. 506-549.
R. L. Kruse, *Data Structures and Program Design,* Prentice-Hall, Englewood Cliffs, N.J., 1984, pp. 112-126.
D. F. Stubbs et al., *Data Structures with Abstract Data Types and Pascal,* Brooks-Cole Publishing, Monterey, Calif., 1985, pp. 310-336.

*Primary Examiner*—Thomas C. Lee
*Assistant Examiner*—Paul Harrity
*Attorney, Agent, or Firm*—Leonard Charles Suchyta; James W. Falk

[57] ABSTRACT

An apparatus for performing storage and retrieval in an information storage system is disclosed which uses the hashing technique. In order to provide efficient and graceful operation under varying loading conditions, the system shifts between collision avoidance by linear probing with open addressing when the load is below a threshold, and collision avoidance by external chaining when the load is above a threshold. Insertion, deletion and retrieval operations are arranged to switch dynamically between the two collision avoidance stratagems as the local loading factor on the system, as measured by the number of records hashed to the same address, crosses preselected thresholds.

3 Claims, 4 Drawing Sheets

RETRIEVE

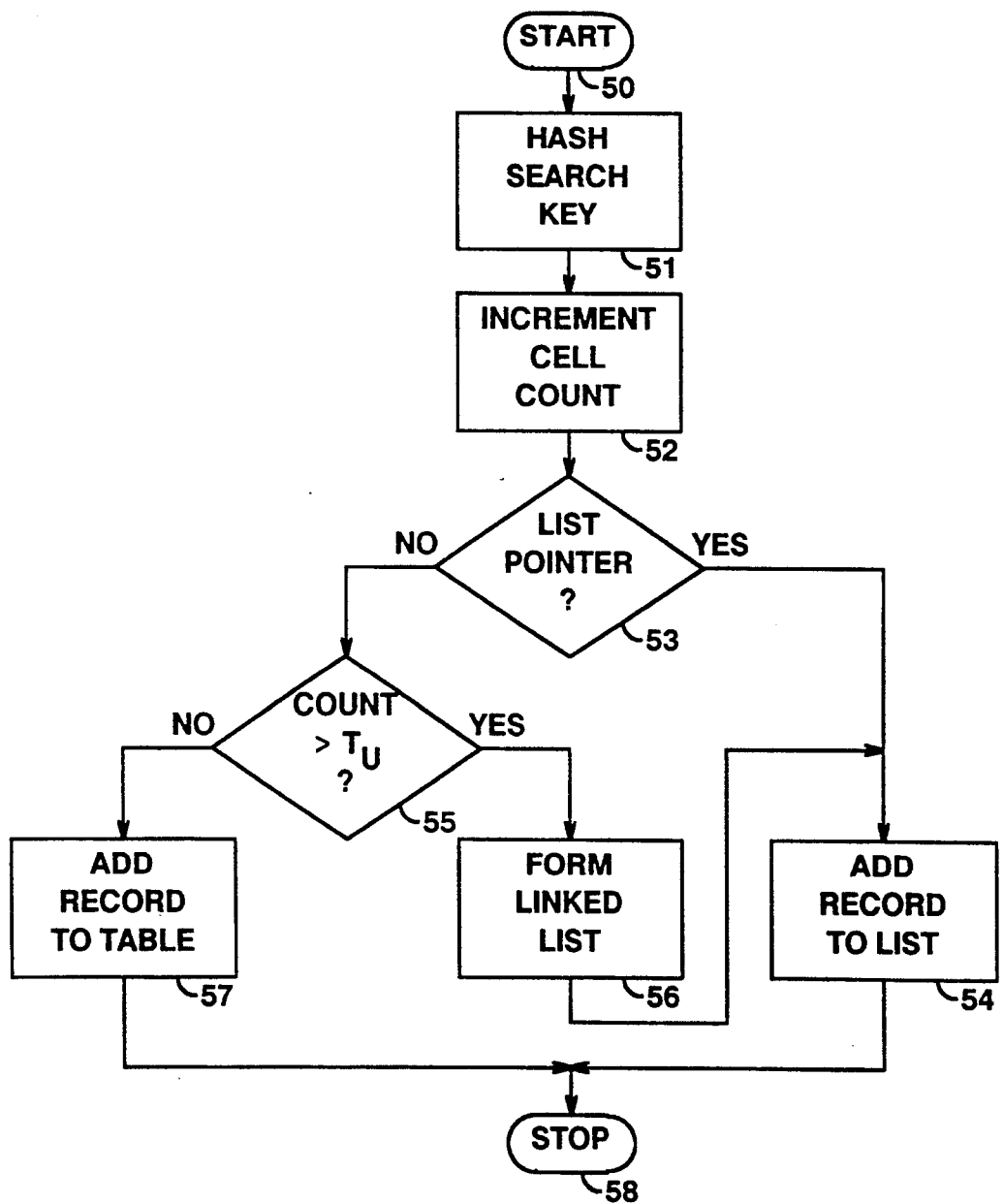

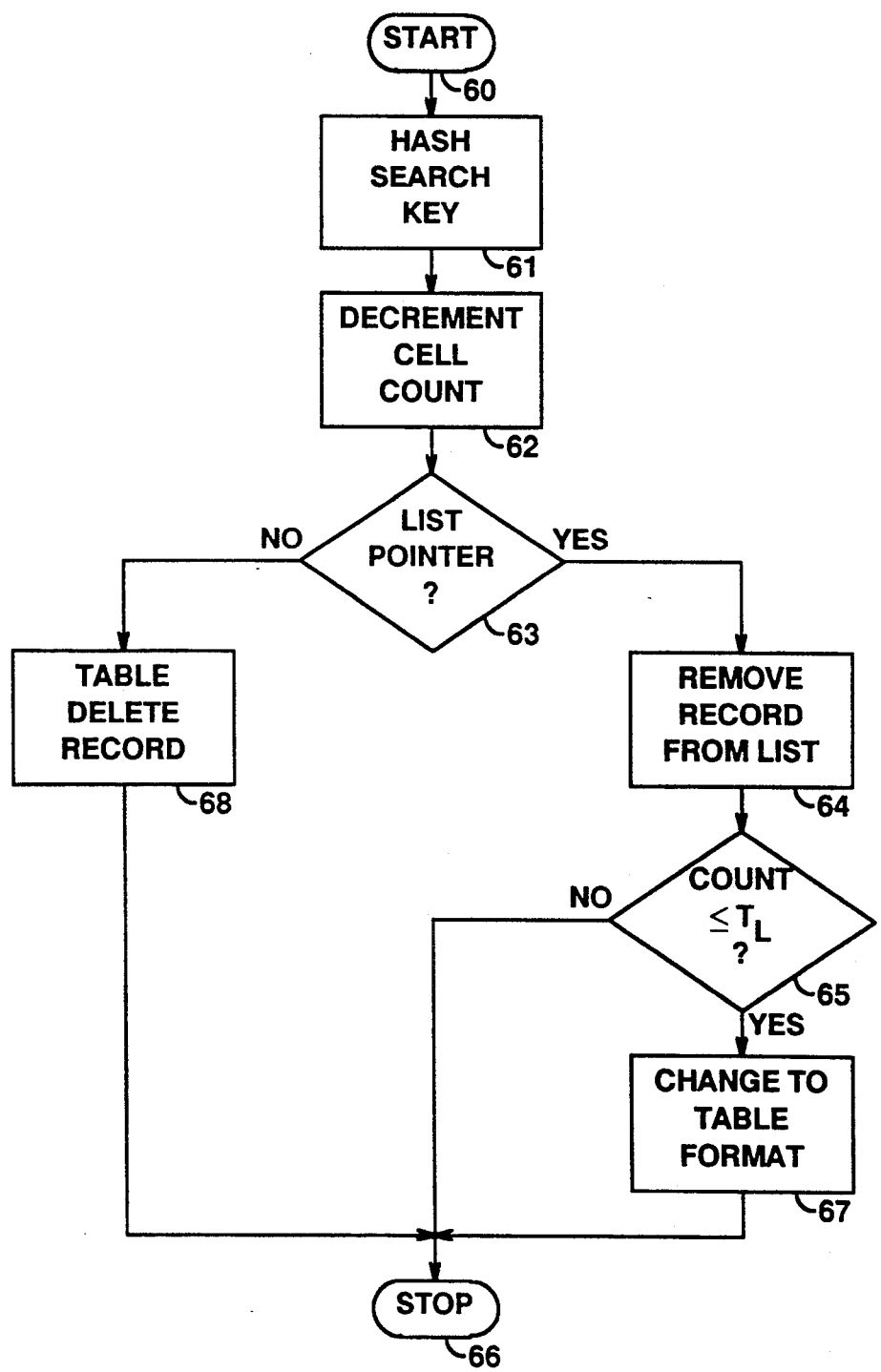

METHODS AND APPARATUS FOR INFORMATION STORAGE AND RETRIEVAL UTILIZING A METHOD OF HASHING AND DIFFERENT COLLISION AVOIDANCE SCHEMES DEPENDING UPON CLUSTERING IN THE HASH TABLE

This application is a continuation of application Ser. No. 07/326,976, filed Mar. 22, 1989, now abandoned.

TECHNICAL FIELD

This invention relates to information storage and retrieval systems and, more particularly, to the dynamic reorganization of the stored information to optimize access in such systems.

BACKGROUND OF THE INVENTION

Information or data stored in a computer-controlled storage mechanism can be retrieved by searching for a particular key in the stored records. The stored record with a key matching the search key is then retrieved. Such searching techniques require repeated accesses or probes into the storage mechanism to perform key comparisons. In large storage and retrieval systems, such searching, even if augmented by efficient search algorithms such as a binary search, often requires an excessive amount of time.

Another well-known and much faster method for storing and retrieving information from computer store involves the use of so-called "hashing" techniques. These techniques are also sometimes called scatter-storage or key-transformation techniques. In a system using hashing, the key is operated upon (by a hashing function) to produce a storage address in the storage space (called the hash table). This storage address is then used to access the desired storage location directly with fewer storage accesses or probes than sequential or binary searches. Hashing techniques are described in the classic text by D. Knuth entitled The Art of Computer Programming, Volume 3, Sorting and Searching, pp. 506-549, Addison-Wesley, Reading, Mass., 1973.

Hashing functions are designed to translate the universe of keys into addresses uniformly distributed throughout the hash table. Typical hashing operations include truncation, folding, transposition and modulo arithmetic. A disadvantage of hashing techniques is that more than one key can translate into the same storage address, causing "collisions" in storage or retrieval operations. Some form of collision-resolution strategy (sometimes called "rehashing") must therefore be provided. For example, the simple strategy of searching forward from the initial storage address to the first empty storage location will resolve the collision. This latter technique is called linear probing. If the hash table is considered to be circular so that addresses beyond the end of the table map back to the beginning of the table, then the linear probing is done with "open addressing," i.e., with the entire hash table as overflow space in the event that a collision occurs. Deletion of records is accomplished by marking the record as "deleted" but leaving it in place, or by some deletion algorithm. One such deletion algorithm, known as Knuth's deletion algorithm, operates by recursively moving an appropriate one of the next encountered "occupied" record positions into the now "empty" (deleted) record position and marking that next record position as "empty." Iterating this procedure until the first unoccupied record position is encountered results in removal of the record to be deleted. Deletion problems of this type are discussed in considerable detail in Data Structures and Program Design, by R. L. Kruse, Prentice-Hall, Englewood Cliffs, N.J., 1984, pp. 112-126, and Data Structures with Abstract Data Types and PASCAL, by D. F. Stubbs and N. W. Webre, Brooks/Cole Publishing, Monterey, Calif., 1985, pp. 310-336.

Another technique for resolving collisions is called external chaining. In this technique, each hash table position is able to store all records hashing to that location. More particularly, a linked list is used to store the actual records outside of the hash table. The hash table entry, then, is no more than a pointer to the head of the linked list. The linked list is itself searched sequentially when retrieving or storing a record. Deletion is accomplished by adjusting pointers to eliminate the deleted record from the linked list.

The linear probing with open addressing technique has the advantages of simplicity and minimal storage accesses, but the disadvantages of contamination due to deleted records (if records are merely marked as deleted), the overhead of the more complex deletion algorithms such as Knuth's algorithm, and the precipitous degradation of operation under high load factors. External chaining has the advantages of simple deletion algorithms, readily extendible storage size and graceful operation under high load factors. Thus, neither approach is optimum for all storage and retrieval systems.

The problem, then, is to provide the simplicity and speed of access of linear probing techniques for loads involving little or no collisions, but taking advantage of the more graceful operation of external chaining techniques for loads which cause collisions to rise above some preselected threshold.

It is also well-known that the frequency of retrieval of some records is much higher than others. If this frequency data is known ahead of time, the data can be organized in the storage system to minimize the retrieval time of the most frequently accessed records, for example, by placing such records at the initial hashing position or at the head of the chain. Unfortunately, such optimal organization of the storage system requires an a priori knowledge of the frequency of retrieval statistics. A real problem in storage and retrieval systems is the optimal organization of the storage space when no a priori knowledge is available concerning the frequency of retrieval statistics.

SUMMARY OF THE INVENTION

In accordance with the illustrative embodiment of the invention, these and other problems are overcome by using dual storage organization techniques which can be selected "on the fly" while data is being stored or accessed in the storage space. In particular, the key for each new record is hashed to a particular position in the hash table. If the number of records hashing to that same position is below a preselected threshold, the collision is resolved by linear probing under open addressing. Once the number of records hashing to that same position rises above the threshold, all of the records hashing to that position are removed from the hash table and linked by external chaining, leaving a pointer to the head of the chain in the hashed position. When the number of records in the external chain drops below a threshold (not necessarily the same threshold that caused external chaining), the external chain is destroyed and the records returned to the hash table and the records stored there using linear probing under open addressing. Any of the known record deletion techniques can be used in this dynamically combined dual storage system. Each position in the hash table therefore can contain either a record or a pointer to the head of an external chain which can be distinguished, for example, by a one bit flag.

The above system can be simplified by maintaining, in each position of the hash table, a field holding the count of the number of records heretofore hashing to that position in the hash table. This count therefore represents the length of the external chain when the threshold is exceeded.

This dynamic reorganization of the storage space of a storage and retrieval system has the decided advantage of optimizing the retrieval time of records regardless of load factors. Moreover, the higher overhead encountered with external chaining is avoided until the higher load factor (higher number of collisions) suggests that linear probing times will deteriorate substantially. The threshold loadings for switching between the two techniques are, of course, selected to optimize the overall performance of the combined system.

BRIEF DESCRIPTION OF THE DRAWING

A complete understanding of the present invention may be gained by considering the following detailed description in conjunction with the accompanying drawing, in which:

FIG. 4 shows a general flow chart for a record insertion procedure in the dynamically reorganizable, dual storage technique storage and retrieval system in accordance with the present invention; and FIG. 5 shows a general flow chart for a record deletion procedure in the dynamically reorganizable, dual storage technique storage and retrieval system in accordance with the present invention.

To facilitate reader understanding, identical reference numerals are used to designate elements common to the figures.

DETAILED DESCRIPTION

Figure 1:
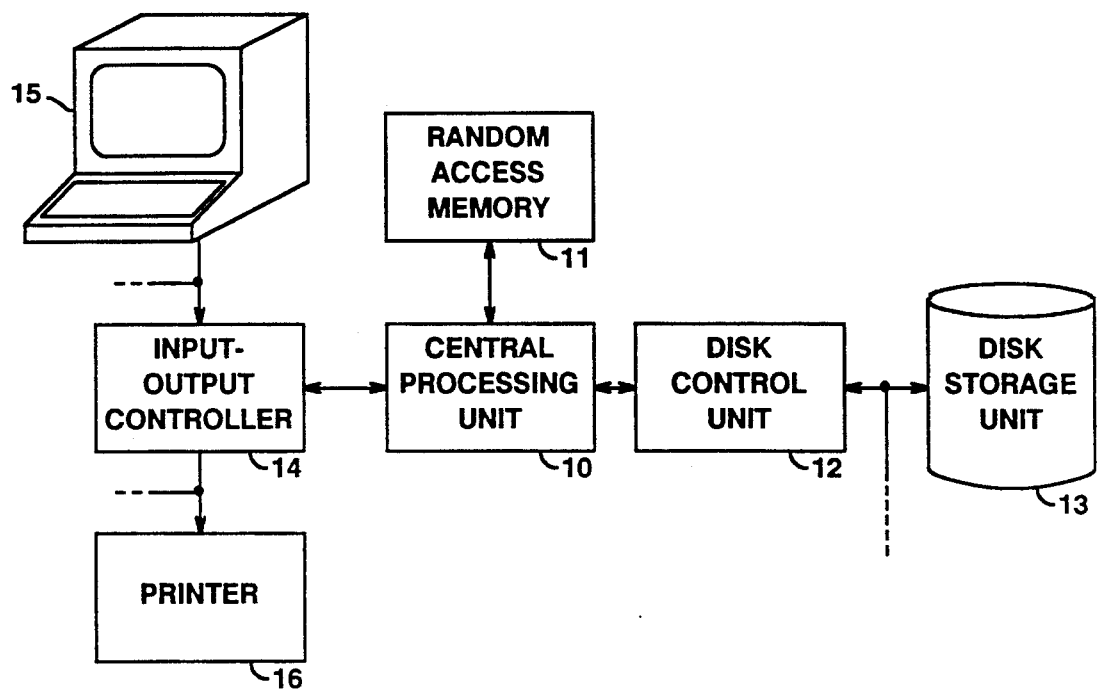
FIG. 1 shows a general block diagram of a computer system hardware arrangement in which the information storage and retrieval system of the present invention can be implemented.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques. CPU 10 may, of course, comprise multiple processors and interact with multiple memory units 11 by way of caches for data and/or instructions, all as is also well-known in the data processing art.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
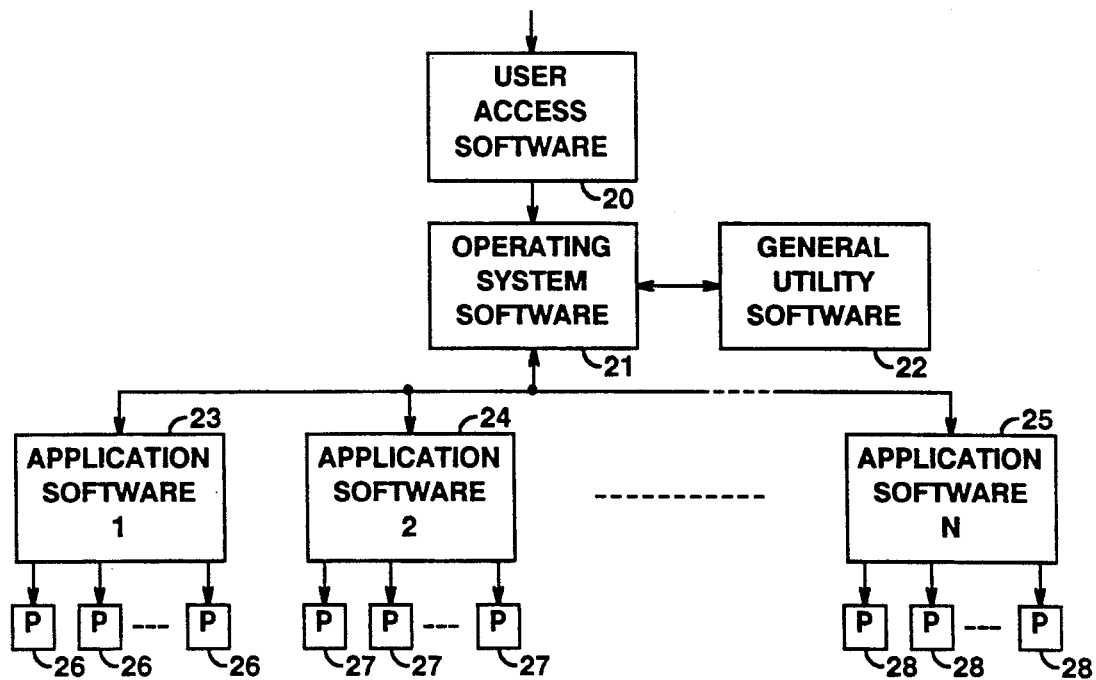
FIG. 2 shows a general block diagram of a computer system software arrangement in which the information storage and retrieval system of the present invention will find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

The computer software system of FIG. 2 typically also includes a plurality of application programs such as application software 23, 24, . . . 25. Application software 23-25 might, for example, comprise an editor, a spread sheet program, a graphics package, a data base manager, and so forth. Each of the application programs 23 through 25 includes or provides access to a plurality of programmed processes 26, 27, . . . 28, respectively. It is the programmed processes 26 through 28 which actually perform the tasks necessary to carry out the purpose of the corresponding application program. In order to make effective use of these application packages, the user must be able to execute the processes 26-28 at the time, and in the sequence, necessary to accomplish the user's goals.

The present invention is concerned with information storage and retrieval systems. Such a system would form one of the application software packages 23, 24, . . . , 25 of FIG. 2. The various processes (26,27,28) which implement the information storage and retrieval system are herein disclosed as flow charts in FIGS. 3, 4 and 5, and shown as pseudocode in the APPENDIX to this specification. It is believed that the creation and execution of the computer programs necessary to carry out these processes are readily apparent to those skilled in the programming art from the present disclosure.

Many fast techniques for storing and retrieving data are known in the prior art. In situations where storage space is considered cheap relative to retrieval time, a technique called hashing is often used. In classic hashing, each record in the information storage system includes a particular field called the key, which is used as the basis for storing and retrieving the associated record. A mathematical function or map, called a hashing function, translates the key into a cell number or address in the storage space, called the hash table. Taken as a whole, a hash table is a logically contiguous, circular list of consecutively numbered, fixed-size storage units called cells each capable of storing a single data item called a record. The hashing function can be any operation on the key which results in hash table addresses more or less evenly distributed throughout the hash table. Known hashing functions include truncation, folding, transposition, modulo arithmetic, and combinations of these operations. Unfortunately, hashing functions do not always produce unique addresses in the hash table. That is, many distinct keys can map into the same cell number, producing what are called collisions. Some form of collision resolution strategy is therefore required in all hashing systems. In every instance of collision, it is necessary to find an empty storage location somewhere else to store the new record. Moreover, such alternate storage locations must be readily reachable during future probes searching for the displaced record.

Two forms of collision resolution are well-known in the prior art. The first is called open addressing. Under open addressing, whenever a collision occurs due to two different keys hashing to the same cell number, a technique called linear probing is used. Under linear probing, a sequential scanning of storage cells takes place, beginning with the next cell following the cell hashed to, and treating the hash table as circular. The record is stored in the first unoccupied cell encountered in the linear probe. Retrieval of the record is similar. The search key is hashed to the initial cell number. If the record is not found there (the keys do not match), the linear probe is used to access all successive cells until the record is found (the keys match). If an empty cell is encountered during this linear probing, the record sought is not in the data base and the process terminates as an unsuccessful search. The deletion of records under open addressing involves either merely marking the cell as deleted, or physically moving the contents of a cell to fill the deleted cell and maintain the continuity of the probe path. The preferred deletion algorithms (called "garbage collection") are disclosed in the copending applications of the present applicant, Ser. Nos. 151,638 and 151,639, both filed Feb. 2, 1988, and assigned to applicant's assignee, now issued as U.S. Pat. Nos. 4,996,663, Feb. 26,1991, and 5,121,495, Jun. 9, 1992, respectively.

A second general technique for collision resolution is called external chaining. Under external chaining, each cell in the hash table effectively stores all of the colliding records. This is accomplished by making each table entry (each cell) consist of a pointer to the head of a linked list of records. Such linked lists are formed by storing records randomly in any available storage space, but maintaining in each record a pointer to the location of the next record in the chain. When a search key is hashed to the hash table entry, the pointer located there is used to locate the first record. If the search key does not match this record, the pointer therein contained is used to locate the second record. In this way, the "chain" of records is traversed sequentially until the desired record is located or until the end of the chain is reached (no pointer to a next record). Deletion of records simply involves adjusting the pointers to bypass the deleted record.

External chaining has numerous advantages over open addressing. The delection procedure is simple and does not leave records in place which must be searched over in future probes, if Knuth's deletion algorithm is not used. The number of records can exceed the size of the hash table, and can be expanded readily without changing the hashing function. Indeed, storage space for new records can be allocated dynamically as needed. Most importantly, the number of probes required to conduct searches for a particular hashed key does not rise precipitously with increases in the table load factor. In an open addressing system, as the table loading grows, the average number of probes necessary to locate a particular record also grows. At some loading level, the successful operation of the retrieval system collapses precipitously.

On the other hand, linear probing under open addressing has distinct advantages over external chaining under more moderate load factors. The addition storage for pointer fields is avoided, along with the processing overhead of following the pointer chains. If the table is implemented in virtual memory, a minimal number of page faults are incurred during record access since the portion of the hash table to be accessed occupies contiguous storage locations on one or two pages.

In accordance with the present invention, the major advantages of both techniques, open addressing and external chaining, are achieved in the same system. More particularly, these two techniques are combined in one system, and the actual storage strategy is selected dynamically, depending on the then current local load factor. Initially, all records are stored in the hash table using the open addressing with linear probing technique. When the local load factor exceeds a preselected threshold, the system shifts dynamically to the external chaining technique. That is, while inserting or deleting a record, the local load factor, as reflected in the number of records hashed to this same hash table cell, is examined. If this number exceeds a threshold, the records hashed to this cell address are reorganized, removed from the hash table itself and organized into an external chain in another part of the store. While such reorganization involves considerable overhead, the payoff comes in subsequent searches where the external chaining greatly reduces the search time. It is assumed, of course, that the frequency of retrievals greatly exceeds the frequency of insertions and deletions, an assumption which holds true for most data storage and retrieval systems. When a deletion from a linked list causes the chain length to fall below a threshold, not necessarily the same threshold that triggered chain formation, the chain is destroyed and the entries reabsorbed into the hash table.

In further accord with the present invention, the dynamic shifting between open addressing and external chaining is facilitated by maintaining a record count field in each occupied hash table cell. This count is incremented each time a new record is hashed to this same cell, and decremented each time a record, which hashes to this same cell, is deleted from the data base. The count field is then consulted on each access for insertion or deletion, and the value in this field used to dynamically determine the collision resolution strategy to be used. Each entry in the hash table cell also advantageously includes a flag indicating whether the table entry is a record or a pointer to an external chain.

Figure 3:
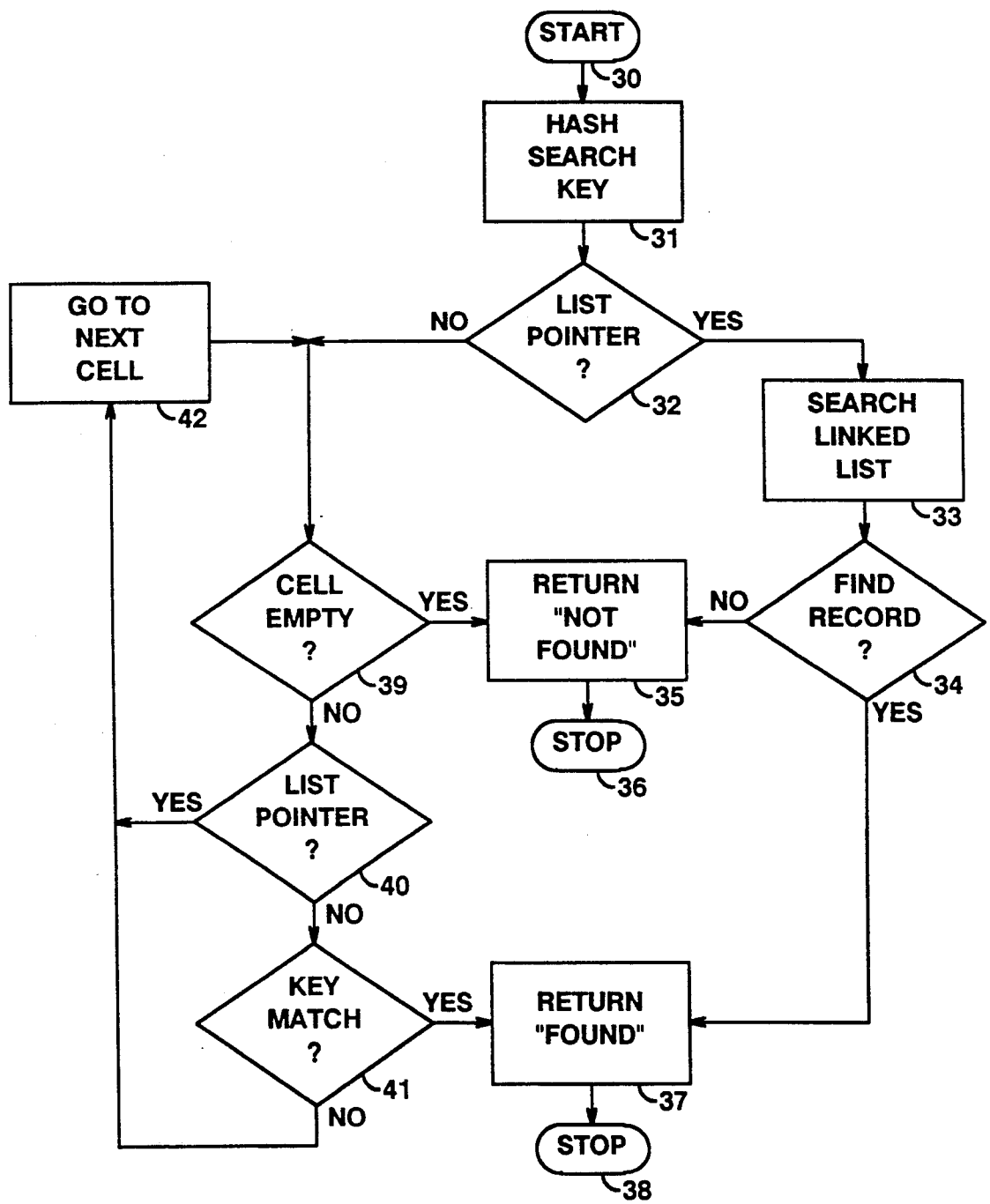
FIG. 3 shows a general flow chart for a record retrieval procedure in a dynamically reorganizable, combined linear probing, external chaining storage and retrieval system in accordance with the present invention.

Referring then to FIG. 3, there is shown a flowchart of a retrieve algorithm for retrieving records from a data storage and retrieval system in accordance with the present invention and involving dual collision resolution schemes dynamically selected depending on load factor. In FIG. 3, starting at start box 30, box 31 is entered where the search key is hashed using any known hashing function. The cell location resulting from the hashing operation is used to access a hash table cell. In decision box 32, the contents of the cell is examined to determine if the cell contains a record or a pointer to an external chain. As previously noted, a one-bit flag can be reserved for this purpose. Alternatively, the length of the contents can be used to distinguish between records and pointers, or the contents examined to make this decision. If the contents of the cell is a list pointer, box 33 is entered to search the external linked list for a matching key. In decision box 34, the records in the linked list are examined to ascertain if the keys match, and if they do, box 37 is entered to return the contents of the matching record. The process is then terminated in box 38. If no matching record is found in the linked list, box 35 is entered to return a message that the search was unsuccessful, and the process terminated in box 36.

Returning to decision box 32, if the contents of the initial hash table cell is not a pointer, decision box 39 is entered to determine if the cell is empty. If the cell is empty, box 35 is entered to return an unsuccessful search message and the process terminated in box 36. If the cell is not empty, decision box 40 is entered to again determine if the contents of the cell is a list pointer. This is necessary because of later iterations of the logic path. If the cell does contain a list pointer, box 42 is entered to advance to the next cell in the hash table. Decision box 39 is then re-entered.

If it is determined in decision box 40 that the contents of the current cell is not a list pointer, decision box 41 is entered where the search key is compared to the key in the current cell. If a match occurs, box 37 is entered to return the matching record and the process terminated in box 38. If a match does not occur in box 41, box 42 is entered to access the next cell in the hash table. Thus, the linear probe of the hash table continues until either an empty cell is encountered (box 39) or a cell with a matching key is encountered (box 41). Intervening cells containing list pointers are passed over (box 40).

It can be seen that the retrieve process of FIG. 3 serves to locate the target record whether it is stored under the open addressing process or under the external chaining process. The retrieve process of FIG. 3 assumes that the record has previously been stored using the most efficient storage strategy. The insertion process of FIG. 4 insures that this choice is properly made.

Turning then to FIG. 4, there is shown a flowchart of a record insertion process suitable for carrying out the dual storage scheme of the present invention. In FIG. 4, starting at start box 50, box 51 is entered where the search key of the record to be inserted is hashed. Using the hash table address produced by the hashing operation, the count field in the cell at that location is incremented by one in box 52. Decision box 53 is then entered where it is determined whether or not the contents of that cell is a list pointer. If the contents of the cell is a list pointer, box 54 is entered to add the new record to the external chain. This is accomplished by "walking" the chain to its end. The new record is then added at the end of the chain by placing a pointer to the new record in the previously last, but now penultimate, record in the chain. The process then terminates in terminal box 58.

Returning to decision box 53, if the contents of the hashed cell is not a pointer, decision box 55 is entered where the cell count is compared to a numerical upper threshold $T_U$. If the cell count does not exceed this threshold, box 57 is entered where the new record is added to the hash table using standard linear probing techniques. The process then terminates in terminal box 58. If the cell count does exceed the $T_U$ threshold in decision box 55, box 56 is entered where all of the records hashed to this same hash table address are retrieved, formed into an external linked chain and a pointer to that chain placed in the hashed cell address. Box 54 is then entered to place the new record at the end of that chain. The process then terminates in terminal box 58. The process of forming the linked list involves no more than retrieving the hash table records (using FIG. 3), finding a free storage location for the first record, storing the first record there and placing a pointer to that location in the hash table cell, finding another free storage location for the second record, storing the second record there and placing a pointer to that second location in the first record, and so forth. If the hash table cell originally stored a record that hashes elsewhere (from a previous probe), then that record must be relocated in the hash table to make room for the pointer, again using the open addressing technique.

In FIG. 5 there is shown a flowchart of a record deletion process. Starting at start box 60, box 61 is entered where the search key is hashed to provide a hash table cell location. In box 62, the cell count field at that cell location is decremented by one. Decision box 63 is then entered to determine whether or not the contents of that cell is a list pointer. If it is not, box 68 is entered to use any known table deletion algorithm to remove the record from the hash table. As previously noted, the record can merely be marked "deleted" and left in place or can by physically deleted by some algorithm such as Knuth's algorithm. The process terminates in terminal box 66.

If it is determined in decision box 63 that the contents of the cell is a list pointer, box 64 is entered where the record to be deleted is removed from the linked list. This is easily accomplished by adjusting the pointer in the chain just before the record to be deleted to point the the record following the record to deleted. The storage space of the thus "deleted" record can then be returned to free storage space for future assignment to another record.

Following the removal of the record in box 64, decision box 65 is entered where the decremented cell count is compared to another lower threshold $T_L$. If the count is not equal to or less than this $T_L$ threshold, the process terminates in terminal box 6. If, however, the cell count is less than or equal to the $T_L$ threshold, box 67 is entered where the linked list is disassembled and the records added to the hash table using linear probing techniques. The process then terminates in terminal box 66.

It can be seen that the processes of FIGS. 3, 4 and 5 cooperate to provide a dual collision resolution hashed storage system where the form of collision resolution is determined dynamically "on the fly" depending on the local load factor at the time records are to be added or deleted from the system. Pseudo-code listings for each of these processes, together with pseudo-code for two different forms of deletion are included in the APPENDIX. The correspondence between the listings and FIGS. 3, 4 and 5 are obvious and will not be further described here.

It should also be clear to those skilled in the art that further embodiments of the present invention may be made by those skilled in the art without departing from the teachings of the present invention.

APPENDIX

Formal Definitions a. const *table_size*  /* size of hash table */ b. const *upper_threshold*  /* used by *insert* for conversion to chain structure */ c. const *lower_threshold*  /* used by *delete* for conversion to table structure */

/* *lower_threshold* $\leq$ *upper_threshold* */ d. type *list_element_type* = record

*record_contents*: *record_type*;

*next*: ↑*list_element_type*  /* pointer to next node in linked list */ end e. type *table_element_type* = record

*count*: *integer*;  /* number of stored keys that hash to this cell */

*status*: (*empty*, *occupied*, *deleted*);

case *structure*: (*tbl*, *list*) of  /* type of data structure currently storing records that hash here */

*tbl*: (*record_contents*: *record_type*);

*list*: (*list_head*: ↑*list_element_type*)

end f. var *table*: array[0 .. *table_size*-1] of *table_element_type*  /* hash table */

Initial state of each element of *table*:

a. *count* = 0 b. *status* = *empty* c. *structure* = *tbl*

Retrieve Algorithm procedure *retrieve* (*key*: *key_type*);

var *i*: 0 .. *table_size*-1;

*continue*: *boolean*;

```
begin
  i := hash (key);
  if table[i].structure = list
    then search linked list pointed to by table[i].list_head
    else begin
      continue := true;
      while (table[i].status ≠ empty) and continue do
        if (table[i].structure = tbl) and (table[i].status = occupied)
          then if table[i].record_contents.key = key
                  then continue := false
                  else i := (i + 1) mod table_size
          else i := (i + 1) mod table_size;
      if table[i].status = empty
        then not found
        else found
    end    /* else begin */
end
```

Insert Algorithm

```
procedure insert (new_record: record_type);
  var i, j: 0 .. table_size-1;
      p: ↑list_element_type;   /* used for constructing chain */
  begin
    i := hash (new_record.key);
    table[i].count := table[i].count + 1;
    if table[i].structure = list
      then list_insert (table[i].list_head, new_record);
      else if table[i].count > upper_threshold
        then begin       /* convert to linked list */
          p := nil;      /* initialize for while loop */
          j := i;
          while table[j].status ≠ empty do   /* traverse sequence of records
                                                and add to linked list */
            begin
              if (table[j].structure = tbl) and (table[j].status = occupied)
                then if hash (table[j].record_contents.key) = i
                  then begin
                    list_insert (p, table[j].record_contents);
```

```
                knuth_delete (j)
              end
            else j := (j + 1) mod table_size
          else j := (j + 1) mod table_size
        end;    /* while */
        list_insert (p, new_record);
        if table[i].status = occupied
          then table_insert ( hash (table[i].record_contents.key),
                              table[i].record_contents)
          else table[i].status := occupied;
        table[i].structure := list;
        table[i].list_head := p
      end   /* if else if then begin (convert to linked list) */
    else table_insert (i, new_record)
end
```

Delete Algorithm

```
procedure delete (key: key_type);
  var i: 0 .. table_size-1;
      p: ↑list_element_type;    /* used for traversing chain */
      continue: boolean;
begin
  i := hash (key);
  table[i].count := table[i].count - 1;
  if table[i].structure = list
    then begin    /* delete from linked list */
      search linked list pointed to by table[i].list_head
      and remove record whose key matches key;
      if table[i].count ≤ lower_threshold
        then begin    /* convert linked list to table resident entries */
          p := table[i].list_head;
          table[i].structure := tbl;
          knuth_delete (i);
          while p ≠ nil do
            begin
              table_insert ( hash (p↑.record_contents.key), p↑.record_contents);
              remove p↑ from linked list, dispose of element pointed to by p,
              and advance p to next list element
```

```
            end
      end   /* then begin (convert linked list to table resident entries) */
   end   /* if then begin (delete from linked list) */
   else begin   /* delete table resident entry */
      continue := true;
      while continue do
         if (table[i].structure = tbl) and (table[i].status ≠ deleted)
            then if table[i].record_contents.key = key
                  then continue := false
                  else i := (i + 1) mod table_size
            else i := (i + 1) mod table_size;
         invoke mark_deleted (i) or knuth_delete (i)
   end   /* else begin (delete table resident entry) */
end
```

Mark Deleted Algorithm

```
procedure mark_deleted (i: 0 .. table_size-1);
   begin
      table[i].status := deleted
   endR
```

Knuth Delete Algorithm

```
procedure knuth_delete (i: 0 .. table_size - 1);
      /* Delete cell i from hash table */
   procedure recursive_delete (j, k: 0 .. table_size - 1);
         /* Delete cell k instead of cell j if required */
      begin /* recursive_delete */
         if cell k is marked empty
            then mark cell j empty
            else if record in cell k hashes at or before position j
                  then begin
                     contents(j) := contents(k);
                     recursive_delete (k, (k + 1) mod table_size)
                  end /* then */
                  else recursive_delete (j, (k + 1) mod table_size)
      end; /* recursive_delete */ begin /* knuth_delete */
``` recursive_delete (i, (i + 1) mod table_size)
end /* knuth_delete */

List Insert Algorithm procedure list_insert (var p: ↑list_element_type; new_record: record_type);

/* Allocate list element, put new_record in it, and link to list pointed to by p */ var q: ↑list_element_type;

begin new (q);   /* allocate list element */ q↑.record_contents := new_record;

q↑.next := p;

p := q end

Table Insert Algorithm procedure table_insert (i: 0 .. table_size-1; new_record: record_type);

/* Store new_record in table at or ahead of position i */ begin while table[i].status = occupied do i := (i + 1) mod table_size;

table[i].record_contents := new_record;

table[i].status := occupied end

What is claimed is:

1. An information storage and retrieval system for data records using a portion of each said data record for generating a hashed storage address in said system, said system comprising storage means for storing a collision count for each set of said data records having identical hashed storage addresses, first means responsive to said storage means for locally resolving collisions by open addressing when said collision count in said storage means is below a preselected threshold, and second means responsive to said storage means for locally resolving collisions by external chaining when said collision count in said storage means is equal to or greater than said preselected threshold.

2. The information storage and retrieval system according to claim 1 further comprising means for storing one of said data records at said hashed storage address when said collision count is below said preselected threshold.

3. The information storage and retrieval system according to claim 1 further comprising means for storing a pointer to one of said data records at said at said hashed storage address when said collision count is equal to or greater than said preselected threshold.

* * * * *